United States Patent
Coaplen

(10) Patent No.: US 7,731,445 B2
(45) Date of Patent: Jun. 8, 2010

(54) CAPTURED SHIM HEAD SET FOR BICYCLES

(75) Inventor: Joshua Coaplen, Asheville, NC (US)

(73) Assignee: Cane Creek Cycling Components, Inc., Fletcher, NC (US)

( * ) Notice: Subject to any disclaimer, the term of this patent is extended or adjusted under 35 U.S.C. 154(b) by 0 days.

(21) Appl. No.: 11/782,162

(22) Filed: Jul. 24, 2007

(65) Prior Publication Data

US 2009/0028637 A1 Jan. 29, 2009

(51) Int. Cl.
*B62K 21/06* (2006.01)

(52) U.S. Cl. .................. 403/367; 403/368; 280/279

(58) Field of Classification Search .............. 403/365, 403/367, 368, 369, 371, 372; 280/279, 280; 285/279
See application file for complete search history.

(56) References Cited

U.S. PATENT DOCUMENTS

| | | | | |
|---|---|---|---|---|
| 2,010,292 | A * | 8/1935 | Campbell | 403/369 |
| 4,445,703 | A * | 5/1984 | Tange | 280/279 |
| 5,095,770 | A | 3/1992 | Rader, III | |
| 5,291,797 | A * | 3/1994 | Chi | 280/279 |
| 6,332,735 | B1 * | 12/2001 | Wang | 403/371 |
| 6,651,525 | B2 | 11/2003 | Jiang | |
| 2004/0007850 | A1 * | 1/2004 | Crozet et al. | 280/280 |
| 2007/0222177 | A1 * | 9/2007 | Chiang | 280/280 |

FOREIGN PATENT DOCUMENTS

JP 8-226437 A 9/1996

OTHER PUBLICATIONS

Headtube Reducers & A-Headset Shims, Wheels Manufacturing, Inc., Precision Bicycle Products—Products; http://www.wheelsmfg.com/products.php?cat=shims&prod=headtube; Jul. 2, 2007; 1 page.
Bikeparts.com—Viewing Category: Headset > Shim; http://www.bikepartsusa.com/view.asp?f_c=Headset&f_c2=shim; Jul. 2, 2007; 1 page.
Raceface Team SL Reviews; Consumer Reviews; Submitted by AZMTNCycle a Cross Country Rider From Tempe, AZ., US; Date Reviewed: Jul. 15, 2004 10:51:06 AM; http://www.mtbr.com/reviews/Headset/product_21920.shtml; 1 page.

* cited by examiner

*Primary Examiner*—Michael P Ferguson
(74) *Attorney, Agent, or Firm*—David S. Safran; Roberts Mlotkowski Safran & Cole, P.C.

(57) ABSTRACT

A captured shim head set for a bicycle has a bearing set for mounting on the head tube of a bicycle; a member for axially loading the bearing set and radially affixing the bearing set to a steerer tube of a bicycle front fork; a top cap for covering the bearing set and with which an axial load is applied to the member; and at least one washer-shaped shim for adjusting the spacing between the top cap and member. A lost motion mechanism is formed between the member and top cap and at least one washer-shaped shim is selectively capturable in the lost motion mechanism for limiting the degree of movement between the member and top cap in a manner limiting the distance that the top cap is movable towards the member.

12 Claims, 4 Drawing Sheets

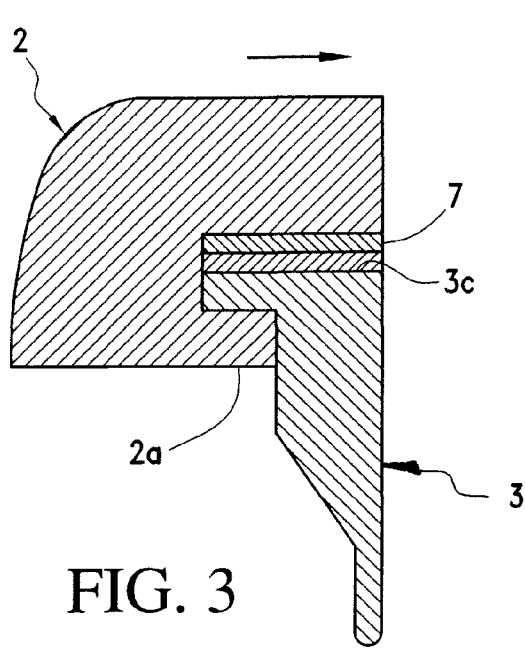
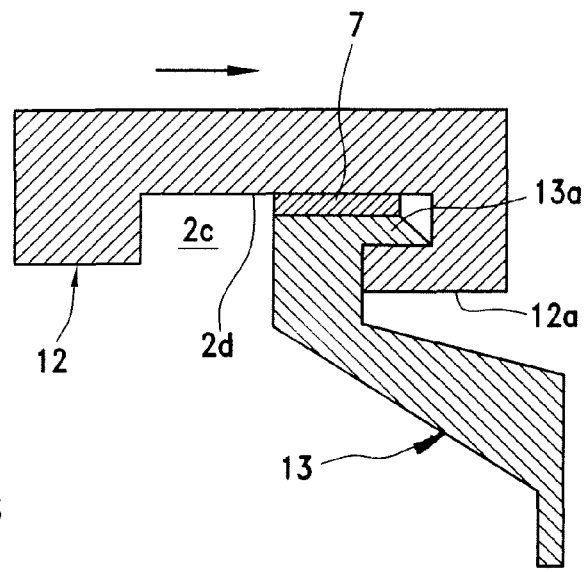
FIG. 3
FIG. 4
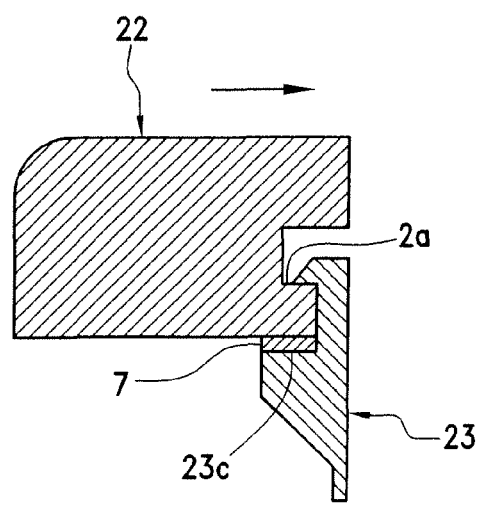
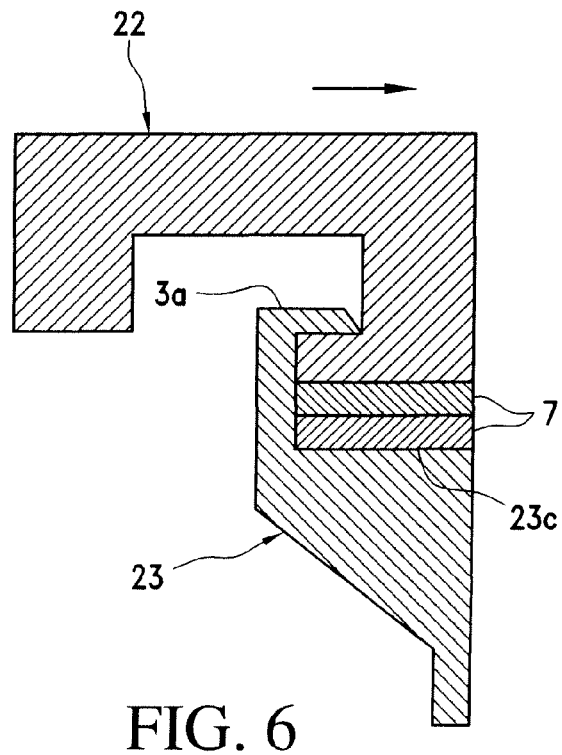
FIG. 5
FIG. 6

CAPTURED SHIM HEAD SET FOR BICYCLES

BACKGROUND OF THE INVENTION

1. Field of the Invention

The present invention relates to headsets for bicycles as are used for rotationally mounting the steerer tube of the bicycle front fork in the head tube of the bicycle frame.

2. Description of Related Art

Head sets of the so-called threadless type are well known, U.S. Pat. Nos. 5,095,770 and 6,651,525 being examples of such head sets. Typical of this type of headset is the fact that a compression member having a part with a wedge-shaped cross-section is inserted between the bearing race and the steerer tube with an axial load being applied so as to take up the clearance between the steerer tube and the bearing race so as to secure the bearing race to the steerer tube, as well as to axially preload the bearings. However, while bicycle front forks are manufactured with steerer tubes of standard outer diameter sizes (O.D.), the steerer tube is not a precision manufactured product so that significant tolerance variations can and do occur. If the O.D. variation is on the plus side, the fact that it is somewhat too large poses no problem since it simply means that the wedge-shaped portion of the compression ring merely has to be pressed into the bearing race clearance to a lesser extent in order to obtain the necessary fixation and preload. On the other hand, should the O.D. be too small, such does pose a problem since it may not be possible for the wedge-shaped portion to be inserted far enough into the clearance gap to produce the necessary holding forces and bearing preload before the top cap of the head set engages the top of the bearing cup and/or bearing.

The use of shims is generally known for taking up slack in parts of various types. In the headset field, cylindrical shims, sometimes referred to as reducers are known, e.g., for adapting a head set intended for a 1-⅛" to a 1" steerer tube or 1-¼" head set to a 1-⅛" steerer tube. These shims are inserted over the steerer tube and must be held between the bearing race and the steerer tube during installation. Such an operation is difficult for one person and such shims are based on the assumption that the steerer tube O.D. is correct.

It has also been suggested to place a washer-like shim between the top cap of the head set and bearing race to prevent drag on the bearing cup during turning of the steerer tube. However, it can be difficult to properly position such a shim during installation and to maintain such a shim in its proper position during use if the shim has an inner diameter (I.D.) that is larger than the O.D. of the steerer tube, and thus, can slide radially. Furthermore, when it becomes necessary or desirable to disassemble the steering assembly, e.g., to lubricate or replace the bearings, or to change the fork or during traveling, the shims can become lost or misplaced, and thus, the height setting achieved is lost.

SUMMARY OF THE INVENTION

Thus, an objective of the present invention is to provide an improved head set in which one or more shims can be selectively incorporated to compensate for steerer tubes having an O.D. that is undersized.

It is a further objective to achieve the above objective in an manner that will not affect the ease of installation of the head set or move out of place during use.

These objective and others are achieved in accordance with the present invention by providing a cooperative relationship between the top cap of the head set and the compression ring of the head set which will enable one or more shims to be captured between them so as to raise the height of the top cap above the bearing cup and/or bearing.

Further details of the invention are described below with reference to the accompanying drawings which show several embodiments in accordance with the present invention.

BRIEF DESCRIPTION OF THE DRAWINGS

FIGS. 3-6 are partial sectional views of four alternative embodiments of the invention.

DETAILED DESCRIPTION OF THE INVENTION

Figure 1:
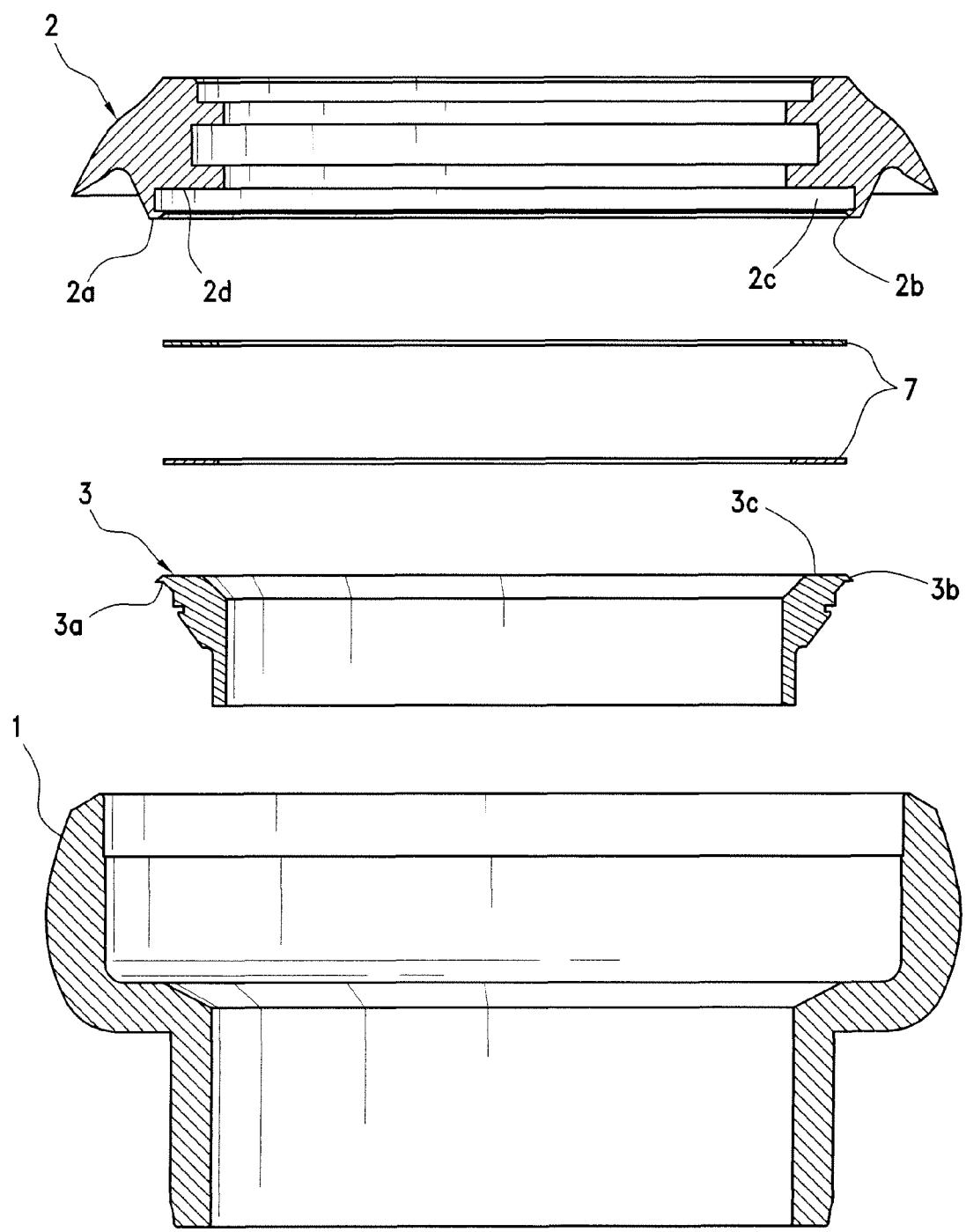
FIG. 1 is an exploded cross-sectional view of a first embodiment of the invention.
Figure 2:
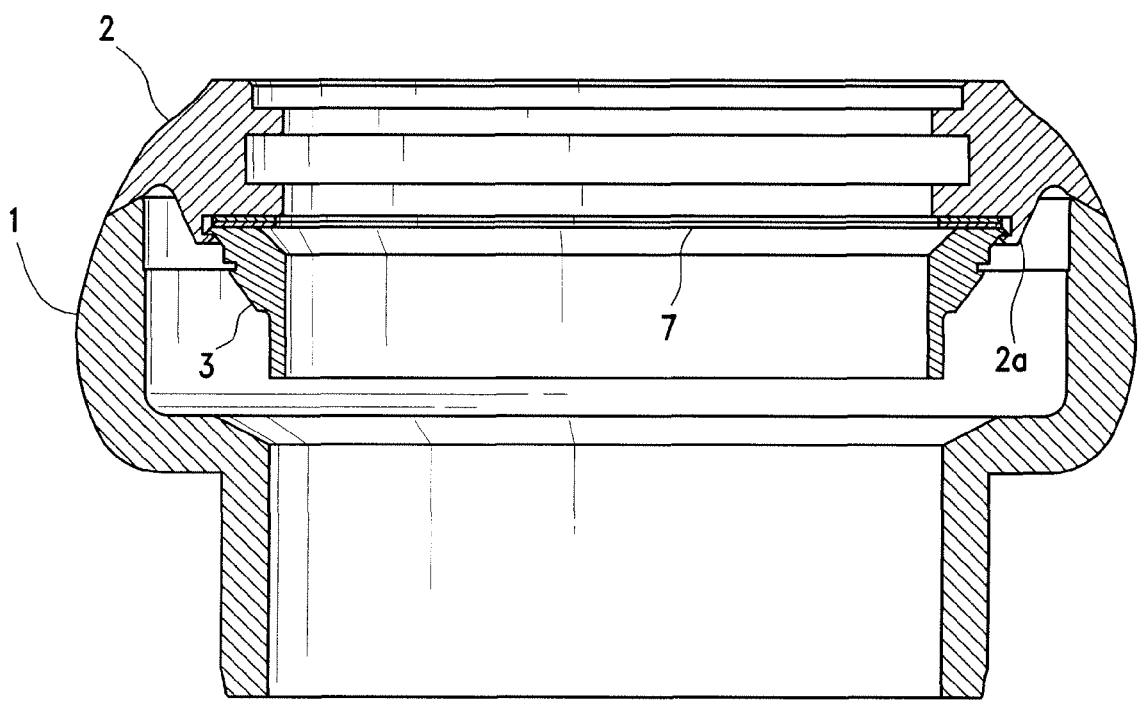
FIG. 2 is a cross-sectional view of the first embodiment of the invention in an assembled position.
Figure 7:
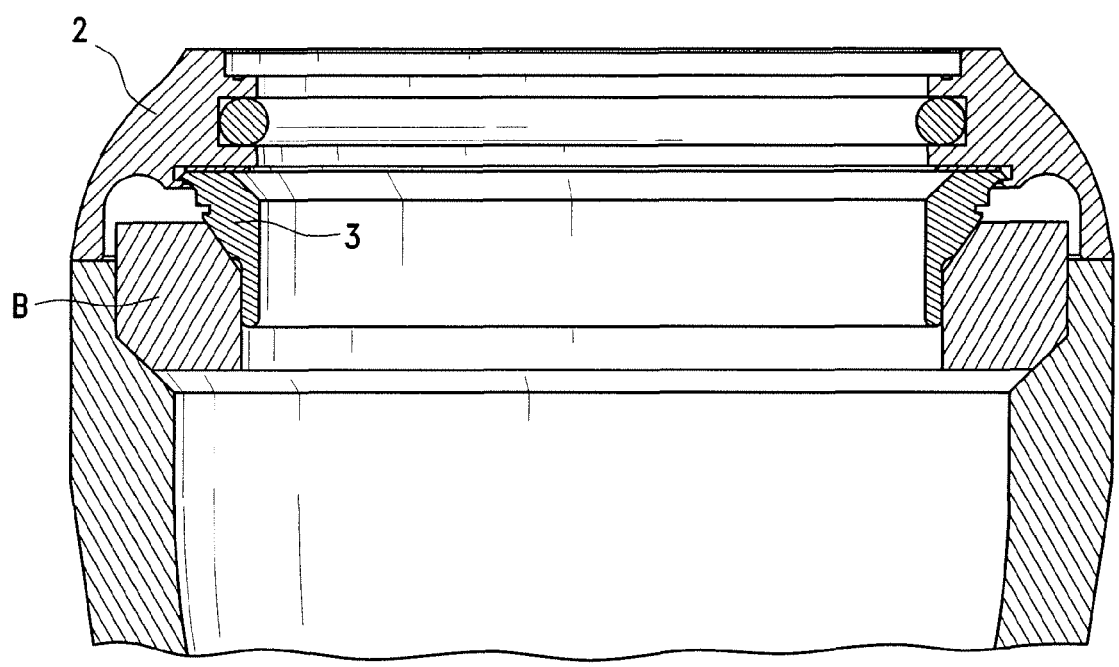
FIG. 7 is a cross-sectional showing the invention applied to a head set assembly in which the bearing set is mounted directly in the head tube.

FIGS. 1 & 2 show a first embodiment of a head set in accordance with the invention which is comprised of a bearing cup 1, a top cap 2, a compression ring 3 and one or more washer-shaped shims 7. The bearing cup 1, as is conventional, receives either a cartridge bearing or a pair of inner and outer bearing races between which a bearing set is located or is itself a bearing race. A primary difference between the top cap 2 and a standard top cap is the provision of a radially inwardly directed hook-shaped projection 2a. Similarly, a primary difference between the compression ring 3 and a standard compression ring is the provision of a radially outwardly directed flange 3a. As can be seen in FIG. 2, the flange 3a is designed to be clipped onto the projection 2a, and to facilitate this, the facing surfaces 2b, 3b are beveled to enable the flange 3a to slid past the projection 2a.

As is also apparent from FIG. 1, a space 2c exists between the upper surface of projection 2a and a contact surface 2d of the top cap 2 that is greater than the height of flange 3a. This enables one or more washer-shaped shims 7 to be disposed between the upper surface 3c of the compression ring 3 and the contact surface 2d of the top cap 2 (two shims 7 being shown). The space 2c is sized to provide an adjustment related to the maximum steerer tube variation that can reasonably be expected to be encountered. If the steerer tube (not shown) has been manufactured toward the upper end of the tolerance range, no shims 7 need be used and upper surface 3c will be engaged by contact surface 2d during installation. However, if the steerer tube is near the lower end of the tolerance range or is undersized, it cannot be engaged by the action of the compression ring 3 before the top cap 2 seats on the bearing cup 1, then one or more shims 7, as needed, can be disposed on the upper surface 3c of the compression ring 3 which then become captured between the contact surface 2d and the compression ring 3.

The captured shim(s) 7 have the effect of raising the top cap relative to the compression ring 3, thereby enabling the top cap 2 to press the compression ring 3 sufficiently further into the bearing set (which conventionally has a sloping surface match to the sloping surface 3d of the compression ring 3) before the top cap 2 becomes seated on the bearing cup as is shown in FIG. 2, thereby insuring the application of proper axial and radial forces without the top cap being engaged with the bearing cup so that it will not drag on the bearing cup as the steeerer tube is turned by the handle bar. The manner in which the shim(s) 7 is/are captured poses several advantages.

On the one hand, installation is facilitated because the top cap 2, with the shim(s) 7 and compression ring 3 attached allow the unit to be treated in the manner of a single part. On the other hand, because the shim(s) 7 is captured in space 2c, it/they cannot shift out of position during installation, after installation, during disassembly, and during use.

FIG. 3 shows a modified version of the above-described embodiment which differs only in that the both the top cap 2 and compression ring 3 have planar flanges that engage each other, the bevels and hook-shaped parts having been eliminated. Otherwise, this version is identical in construction and use as that of FIGS. 1 & 2.

The embodiment of FIG. 4 differs from that of FIG. 3 in that it is constructed with reversal of the direction of the projection 12a of top cap 12 and flange 13a of the compression ring 13. In particular, in this case, the flange 13a of the compression ring 13 is oriented radially inwardly instead of outwardly, while the projection 12a of the top cap 12 is directed radially outwardly instead of inwardly. Otherwise, the projection and flange of this embodiment can be constructed and used in the same manner as either of the two preceding embodiments.

The embodiments of FIGS. 5 & 6 are the same as those of FIGS. 3 & 4, respectively, except that the compression ring 23 has been modified so that the shims 7 will captured between facing external end face surfaces of the compression ring 23 and top cap 22. In this case, instead of the shims being placed on top of the compression ring, or within the top cap, prior to the compression ring being clipped into the top cap, the shim(s) 7 will be placed over the upper periphery of the compression ring so as to rest on the contact surface 23c prior to clipping the compression ring 23 into the top cap 22. Of course, the projection and flange configuration of FIGS. 1 & 2 may be utilized as well in these embodiments.

Common to all of the embodiments described above, a lost motion mechanism is formed between the compression ring 3, 13, 23 and top cap 2, 12, 22 in which at least one washer-shaped shim 7 is selectively capturable for limiting the degree of movement between the compression ring 3, 13, 23 and top cap 2, 12, 22 in a manner limiting the distance that the top cap is movable towards the compression ring 3, 13, 23, thereby increasing the extent to which the compression ring is axially movable toward the bearing cup 1 without causing the top cap 2, 12, 22 to engage the bearing cup 1. As a result, the head set of the present invention is able to be usable with steerer tubes that are undersized to a greater extent than otherwise would be possible. Moreover, the distance between the top cap and bearing can be precisely controlled when the head set is in an assemble state. At the same time, the use of one or more shims in accordance with the invention in no way adversely affects the ease of installation of the head set and disassembly of the head set, nor the operation thereof.

While certain specific embodiments have been shown and described, the invention should not be viewed as being limited thereto as numerous variations and other embodiments will become apparent to those of ordinary skill based on the foregoing disclosure. For example, while the shims have been described as being washer-shaped such should be viewed as encompassing all annular washer shapes and in certain circumstances shapes that are not fully annular could be used as well. Likewise, the concepts embodied above will be applicable to other types of threadless head sets having differently configured top caps, compression rings (or other members for serving the same function), and/or bearing cups/supports which can be modified to capture one or more shims between the top cap and the compression ring. Furthermore, while the separate terms flange and projection have been used above for clarity in distinguishing the elements of the top cap from the comparable elements of the compression ring, it should be appreciated that the parts termed projections can be flanges and the parts termed flanges can be projections.

What is claimed is:

1. A captured shim head set for a bicycle, comprising:
   a bearing set having inner and outer bearing races and a through-hole for passing a steerer tube therethrough;
   a bearing cup structured for mounting on a head tube of a bicycle and having an internal receiving space in which said bearing set is seated;
   a substantially ring-shaped compression member engageable with the inner bearing race for axially loading the bearing set against the bearing cup and radially affixing the bearing set to a steerer tube of a bicycle front fork, said compression member having a radially projecting portion;
   a top cap interconnectable with the compression member with a variable spacing between a downward facing contact surface of the top cap and an upward facing surface of the compression member and with which an axial load is applied to the compression member, said top cap having a radially projecting portion which projects in an opposite radial direction relative to the radially projecting portion of the compression member; and
   at least one shim for selectively adjusting the spacing between the downward facing contact surface of the top cap and the upward facing surface of the compression member;
   wherein a lost motion mechanism is formed between said radially projecting portion of the compression member and said radially projecting portion of the top cap, said radially projecting portions being movable relative to each other across said variable spacing by an amount determined by the presence or absence of said at least one shim therebetween, and wherein said at least one shim is selectively capturable in said variable spacing for limiting the degree of movement between the compression member and top cap in a manner limiting the distance that the top cap is movable towards the compression member.

2. The captured shim head set according to claim 1, wherein said at least one shim is in the shape of a flat washer.

3. A captured shim head set according to claim 1, wherein the radially projecting portions of said lost motion mechanism comprise an internal radial flange on the top cap onto which a radial flange of the compression member is suspended with axial play.

4. The captured shim head set according to claim 3, wherein said at least one shim is in the shape of a flat washer.

5. The captured shim head set according to claim 4, wherein said at least one shim is capturable within an internal space formed between an internal contact surface of the top cap and a top surface of the flange of the compression member.

6. The captured shim head set according to claim 4, wherein said at least one shim is capturable within an external space formed between a contact surface on a portion of an end face of the top cap and a contact surface of the compression member formed below the flange and facing the contact surface of the top cap.

7. The captured shim head set according to claim 3, wherein said flange on the top cap is directed radially inward and the flange of the compression member is directed radially outward relative to an axial center line of the head set.

8. The captured shim head set according to claim 3, wherein said flange on the top cap is directed radially outward and the flange of the compression member is directed radially inward relative to an axial center line of the head set.

9. The captured shim head set according to claim 3, wherein the flanges of the top cap and compression member have bevels for facilitating movement of the flange of the compression member through and onto the flange of the top cap.

10. The captured shim head set according to claim 3, wherein said at least one shim is capturable within an internal space formed between an internal contact surface of the top cap and a top surface of the flange of the compression member.

11. The captured shim head set according to claim 3, wherein said compression member and said top cap are located on the same side of said bearing set.

12. The captured shim head set according to claim 1, wherein said bearing set is located between said bearing cup and said compression member.

* * * * *